United States Patent [19]
Parkison

[11] 3,736,959
[45] June 5, 1973

[54] SINGLE LEVER FAUCET
[75] Inventor: Richard G. Parkison, Somerville, N.J.
[73] Assignee: American Standard Inc., New York, N.Y.
[22] Filed: Dec. 9, 1971
[21] Appl. No.: 206,400

Related U.S. Application Data
[63] Continuation-in-part of Ser. No. 698,830, Jan. 18, 1968, which is a continuation-in-part of Ser. No. 423,534, Jan. 5, 1965, abandoned.

[52] U.S. Cl............................137/625.17, 137/454.6
[51] Int. Cl...............................................F16k 11/00
[58] Field of Search.....................137/625.17, 454.5, 137/454.6, 625.41, 625.42

[56] References Cited
UNITED STATES PATENTS

| | | | |
|---|---|---|---|
| 2,977,986 | 4/1961 | Hinderer et al. | 137/625.17 |
| 3,023,769 | 3/1962 | Williams | 137/625.17 X |
| 3,035,612 | 5/1962 | Lyon | 137/625.17 |
| 3,094,139 | 6/1963 | Budde et al. | 137/454.6 |

Primary Examiner—Samuel Scott
Assistant Examiner—Ira S. Lazarus
Attorney—John E. McRae, Robert G. Crooks and Tennis I. Erstad

[57] ABSTRACT

A water mixing faucet having a support pedestal which rotationally receives the barrel portion of a rotary spout. The pedestal contains water passages for the hot supply stream, the cold supply stream, and the mixed stream leading to the rotary spout. Flow control is achieved by means of ceramic disc valve elements contained within a novel cartridge positioned atop the pedestal. Valve replacement can only be achieved by substitution of a new valve cartridge.

Figure 3:
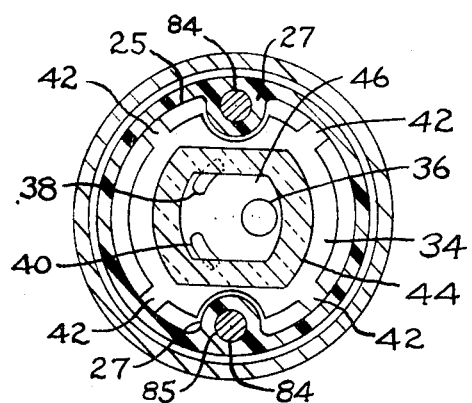

16 Claims, 4 Drawing Figures 3,736,959

SINGLE LEVER FAUCET

This is a Continuation-in part of my co-pending application Ser. No. 698,830, filed Jan. 18, 1968 now abandoned, which was in turn a Continuation-in-part of application Ser. No. 423,534, filed Jan. 5, 1965 (now abandoned).

SUMMARY OF THE INVENTION

It is known to provide water mixing faucets for kitchen or lavatory use, wherein the controlling element is a ceramic disc slidable on the face of a second stationary disc. Such ceramic disc valves are characterized by extreme hardness and flatness of the sliding disc surfaces. These valves therefore have good sealing characteristics and relatively long service lives.

The present invention proposes a valve disc cartridge construction for eliminating errors in service replacement operations, possible when conventional valve discs and their supporting structures are individually removed and replaced in separate operational steps. It is believed that by using the valve disc cartridge concept it should be possible to minimize serviceman error in the valve replacement operation.

The present invention further proposes a mixing faucet wherein the valve disc cartridge is positioned on the upper face of a support pedestal, said pedestal containing valve water passages for directing water streams to and from the discs. The pedestal also functions as a mounting device for a rotary spout that receives water from one of the pedestal passages, the arrangement being such as to provide a strong wobble-free mounting for a rotary spout.

THE DRAWINGS

Figure 1:
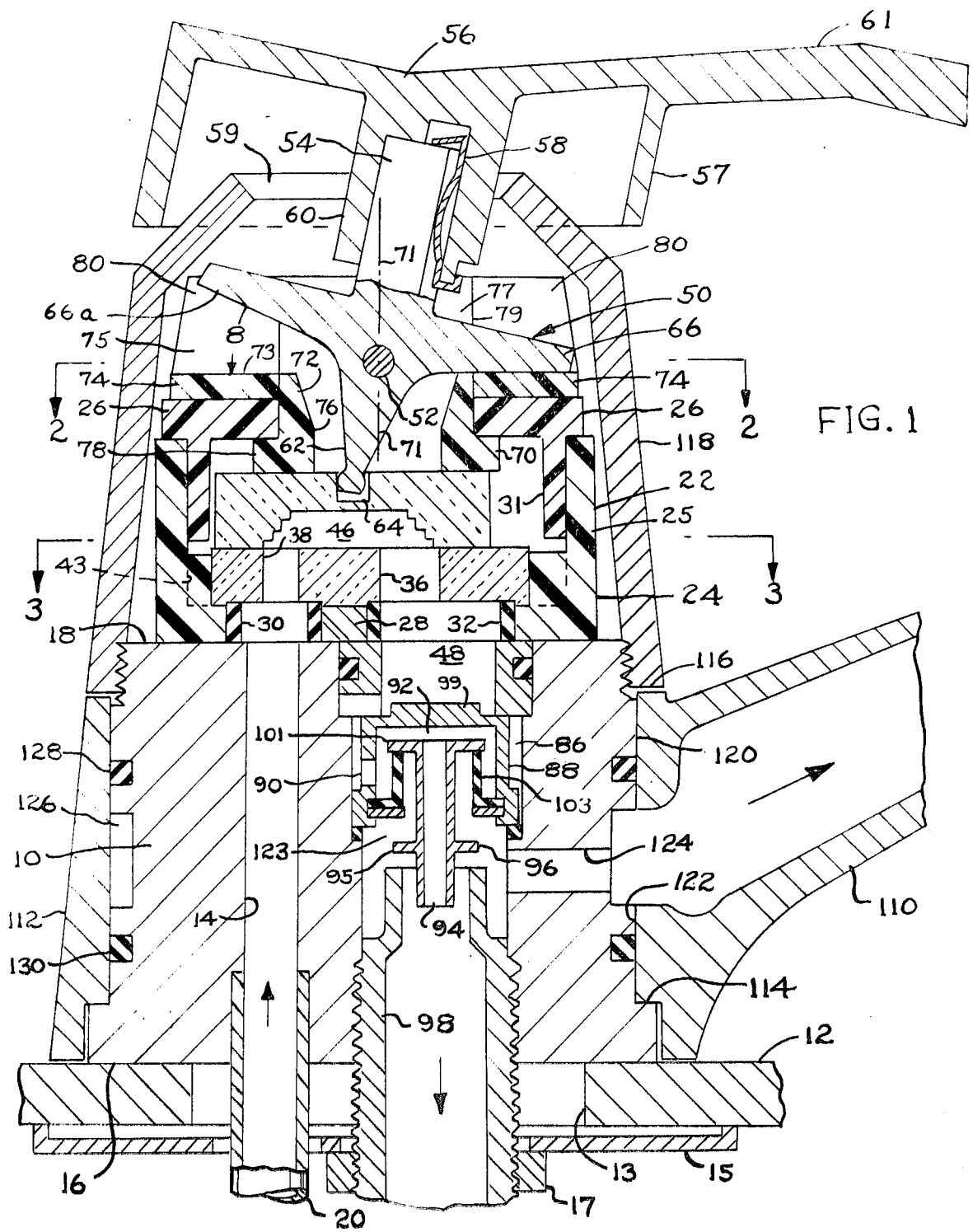
Figure 2:
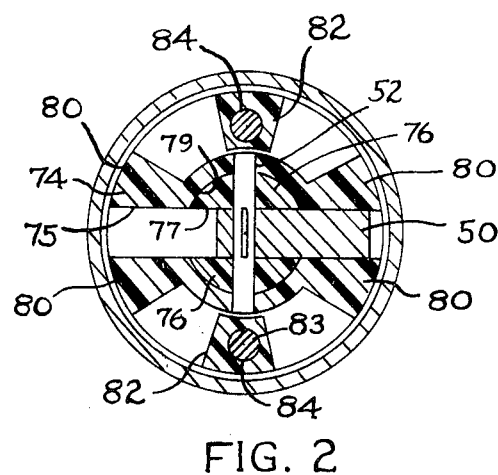
Figure 4:
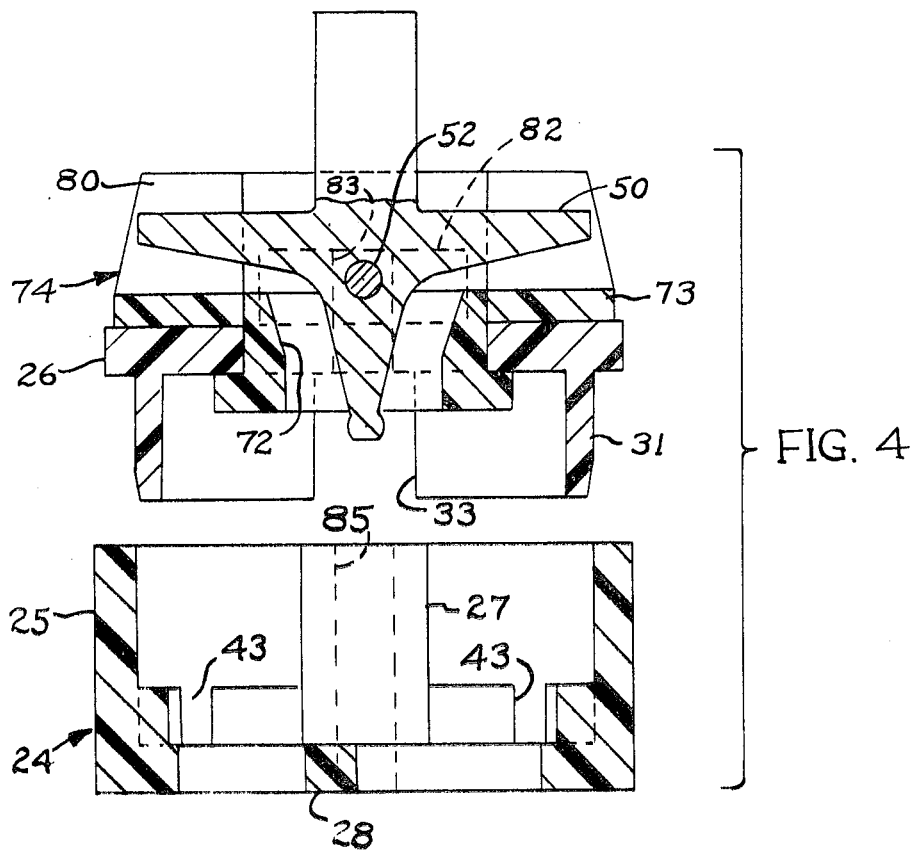

FIG. 1 is a sectional view taken through a mixing faucet embodying the invention;

FIGS. 2 and 3 are reduced sectional views taken on lines 2—2 and 3—3 in FIG. 1;

FIG. 4 is an exploded view of parts used in the FIG. 1 embodiment.

GENERAL ARRANGEMENT

As shown in FIG. 1, the mixing faucet comprises a block-like pedestal 10 having a water supply passage 14 for one of the fluids (hot or cold). The fluid flows upwardly through passage 14 and an opening 38 in a stationary ceramic disc 34, thence through a recess 46 in a movable ceramic disc 44, and thence downwardly through an opening 36 to a chamber 48. The fluid can thereafter flow downwardly through a pressure-operated diverter mechanism 88, which directs the fluid either into spout 110 or pipe 98, depending on the condition of a manual valve on a spray head attached to pipe 98.

A supply passage similar to passage 14 is provided for the other fluid. Each supply stream leads to recess 46 so that the recess constitutes a mixing chamber. The outlet temperature and volume is controlled by the position of valve disc 44, i.e., the extent to which the disc overlaps or registers with the two supply ports in disc 34. The entire flow exits from mixing chamber 46 through the single opening 36.

Disc 44 is slidably actuated to its various positions on the stationary disc by means of a pivotal actuator 50 which carries an external handle 56. Volume control is accomplished by tilting the handle up or down in a vertical arc. Temperature control is achieved by rotating the handle through a horizontal arc. The tilting and rotating motions may be accomplished concurrently or one after the other, as desired by the user.

THE DRAWINGS IN GREATER DETAIL

FIG. 1 shows a mixing faucet which comprises a cylindrical pedestal 10 upstanding from a horizontal sink or lavatory rim wall 12. The pedestal contains or forms a vertical water passage 14 extending from a supply tube 20 soldered to the lower face 16 of the pedestal. Illustratively, pedestal 10 would have a height on the order of two inches; water supply tube 20 would in practice extend below the pedestal a distance of about five to ten inches, depending on the type of installation. FIG. 1 shows a water supply passage system for one of the fluids (cold or hot). A similar passage system would be provided for the other water stream (hot or cold). The non-illustrated passage system would be directly behind the passage system shown in FIG. 1.

CARTRIDGE DESIGN

Located on the pedestal upper face 18 is a mixing valve cartridge body 22 comprising a cup-like casing 24 and connected cap element 26, both preferably formed as plastic moldings. Casing 24 includes a bottom wall 28 having three circular openings, two of which are shown in FIG. 1. One of the openings receives an elastomeric seal 30, and the other opening receives a second somewhat larger elastomeric seal 32. The non-illustrated opening would contain a seal similar to seal 30.

Casing 24 is provided with an endless upstanding peripheral wall 25 that is enlarged at two diametrically spaced points to form bosses 27 (FIG. 3). Cap 26 is of circular plan outline, and is provided with a depending skirt 31 that fits within casing wall 25 except at the zones occupied by bosses 27. The skirt is slit at 33 (FIG. 4) to accommodate bosses 27.

CERAMIC VALVE DISC DESIGN

The disc assembly includes a stationary ceramic disc 34 having three flow openings or apertures, two of which are shown in FIG. 1. FIG. 3 references the three apertures by numerals 36, 38 and 40. Disc 34 is precluded from lateral movement by means of four integrally-formed prongs or fingers 42 that fit into slots 43 in the side wall of casing element 24. These slots preclude lateral movement of the disc, but still allow vertical shifting of the disc due to compressive stress from the sealing elements 30 and 32. The sealing elements preferably have free axial dimensions somewhat greater than the thickness of the casing bottom wall 28 to provide seal compression when the disc is installed between wall 28 and the superjacent disc 44.

Disc 44 is recessed at 46 to selectively interconnect the disc 34 apertures 36, 38 and 40. As seen in FIG. 1, recess 46 spans or connects flow apertures 38 and 36 in stationary disc 34. Accordingly water in supply passage 14 can flow upwardly through opening 38 into recess 46, and thence downwardly through opening 36 to an outlet chamber 48. As shown in FIG. 3, recess 46 is generally rectangular in plan outline so that in the FIG. 3 position of disc 44 its recess 46 also interconnects the other fluid supply aperture 40 to the outlet aperture 36. In its FIG. 3 position disc 44 provides an outlet stream having an intermediate temperature; i.e., a stream which is a mixture of the two supply streams. The disc can be moved in various horizontal directions to provide different outlet stream temperatures and flow rates.

ACTUATOR DESIGN

Movement of ceramic disc 46 horizontally along the upper face of disc 34 is achieved by means of an actuator 50 that is mounted for pivotal movement on a pivot pin 52. Actuator 50 includes a stem 54 that extends upwardly into a non-circular hole formed in an actuating handle 56. A suitable spring leaf 58 is carried by the central tubular position 60 of the handle to frictionally engage a side surface of stem 54 to thereby releasably retain the handle on the stem. The frictional force is preferably great enough that the user would not inadvertently lift the handle off of the stem but not so great as to prevent upward removal of the handle from the valve stem by a knowledgeable service man.

Actuator 50 is provided with a depending pusher element 62 that has cylindrical surface areas engageable with the end surfaces of a slot 64 formed in the upper face of ceramic disc 44. In its illustrated position actuator 50 is prevented from clockwise movement by means of an integrally formed wing-like arm 66. A second wing-like arm 66a permits limited counter clockwise movement of the actuator, as denoted by directional arrow 8. Counter clockwise movement of the actuator causes pusher element 66 to move ceramic disc 44 rightwardly so that the peripheral land area bordering recess 46 moves progressively across the two supply apertures 38 and 40 thereby throttling the flow. The location or orientation of wing-like arm 66a is such that when the actuator has reached the limit of its counter clockwise movement recess 46 will no longer communicate with flow apertures 38 or 40. The actuator can be moved clockwise to reverse the movement of disc 44 back to its illustrated position. It will be seen that movement of actuator 50 around pivotal axis 52 will regulate the total flow of water from passages 38 and 40 into passage 36 (i.e., between zero flow and maximum flow). Such movement will not apportion the relatively flows, i.e., it will not vary the relative flows of hot and cold water.

RACE ELEMENT DESIGN

The flow ratios of the two supply streams are controlled by rotary movement of disc 44 about the vertical axis 71 of a superjacent race element 70. Element 70 is a two piece structure comprising a first barrel member 72 and a second channel member 74. Member 72 includes a hollow cylindrical portion 76 having a peripheral flange 78. Cylindrical portion 76 extends upwardly through a circular bore 79 formed by the upstanding walls 80 of the channel element 74.

As seen best in FIG. 2, the cylindrical barrel portion 76 is slotted at 77 to accommodate the actuator 50. Slot 77 has the same width dimension as slot 75 formed in channel 74, the two slots therefore forming one continuous slot that embraces or receives actuator 50. The base wall 73 of channel member 74 has a plan configuration which corresponds to the outline of walls 80 as seen in FIG. 2. Member 74 can thereby rotate in a horizontal plane around axis 71 (until limited by the stationary bosses 82).

It should be considered that the two race-forming members 72 and 74 rotate as a unit around axis 71. The two members are rigidly interconnected against relative rotation by the pivot pin 52. Actuator 50 rotates with the race assembly because of its disposition in slots 75 and 77. The actuator has an additional freedom of motion around the axis of pin 52.

PUSHER ELEMENT ACTION

The aforementioned pusher element 62 has flat side surfaces which closely engage against flat side surface of slot 64. Therefore rotation of race element 70 around axis 71 causes actuator 50 to transmit the rotation to ceramic disc 44. The disc rotation causes recess 46 to uncover varying areas of flow apertures 38 and 40. In the FIG. 3 position of disc 44 equal areas of apertures 38 and 40 are uncovered so that the outlet stream has an intermediate temperature. Clockwise rotation of the disc progressively closes aperture 40 and opens aperture 38; counter clockwise rotation of the disc progressively closes aperture 38 and opens aperture 40. In this manner it is possible to vary or control the outlet temperature.

The volume control is achieved by tilting movement of actuator 50 around the axis of pivot pin 52. Thus, clockwise movement of the actuator moves disc 44 leftwardly to increase the volume, and counter clockwise movement of the actuator moves disc 44 rightwardly to decrease the volume. Arms 66 and 66a limit the back-and-forth tilting movement.

Rotational movement of the handle (and associated mechanisms) is limited by arms 80 (seen best in FIG. 2). These arms register with upstanding lugs or bosses 82 formed as integral extensions of cap element 26. In operation, rotation of the race element 70 through an arc of about 80° (40° in each direction) causes the race element walls 80 to strike bosses 82 and limit the rotational movement. The bosses are formed with circular holes 83 that register with similar holes 85 in bosses 27 of casing element 24. The registering holes receive screws 84 that thread into tapped holes in the upper face of pedestal 10. These screws thereby releasably retain the entire cartridge on pedestal 10. When these screws are unthreaded it is possible to remove and replace the complete cartridge.

DIVERTER VALVE

The water in chamber 48 flows freely downwardly into annular space 86 surrounding the diverter valve housing 88. The side wall of this housing is formed with a number of windows 90 which allow the water to freely flow into the interior space 92. Space 92 communicated with an interior passage 94 in the tubular valve element 96 so that under certain circumstances the water can flow into the large pipe 98 leading to a spray head (not shown).

When a manual valve on the spray head is actuated to its closed position the water pressure builds up in pipe 98, thereby exerting hydraulic pressure on the underside of valve flange 95. The pressure lifts the valve upwardly toward wall 99 of housing 88, thus cracking the valve flange 101 away from tubular member 103. A flow path is thereby opened from windows 90 underneath flange 101 to passages 123 and 124 leading to the spout.

When the aforementioned spray head valve is opened the pipe 98 pressure drops so that the pressure in chamber 92 acts on flange 101 to move the valve downwardly for admitting fluid to passage 94.

The diverter valve structure is believed to be conventional.

ROTARY SPOUT

FIG. 1 fragmentarily shows a spout 110 having a cylindrical barrel 112 rotatably encircling the pedestal 10. The pedestal is formed with an endless shoulder 114 that forms a lower thrust bearing for the rotary barrel. A second upper thrust bearing is formed by the lower peripheral edge 116 of a tubular escutcheon 118 which is threaded onto the pedestal. The two thrust surfaces 114 and 116 cooperatively prevent axial play of the spout structure. Radial play of the spout is precluded by the axial surfaces 120 and 122 formed respectively on the pedestal and spout barrel.

The spout 110 can be manually rotated around the pedestal without obstructing the flow of water through the spout because pedestal passage 124 leads to a peripheral groove 126 which registers with the spout in any spout position. Suitable O-rings 128 and 130 prevent water leakage across the joints formed by bearing surfaces 120 and 122.

MANUFACTURING ASSEMBLY OPERATIONS

As best seen in FIG. 4, cartridge cap element 26 may be pre-assembled with race element 70 and actuator 50 prior to installation of cap element 26 onto casing element 24. Thus, barrel member 72 of the race element is inserted upwardly through the circular opening in cap element 26, after which channel element 74 is inserted downwardly onto the upstanding portion of the barrel member. Actuator 50 may then be installed in slots 75 and 77, and pivot pin 52 may be driven through the appropriate circular holes in members 50, 72 and 74. Pin 52 serves as the connection or retaining means for the various mechanisms forming the sub-assembly shown in the upper portion of FIG. 4.

The FIG. 4 sub-assembly is installed on casing element 24 so that pusher element 62 enters into slot 64 of the ceramic disc 44. Thereafter the two casing elements 26 and 24 are permanently connected together, as by means of sonic welding or solvent adhesives. The complete cartridge assembly is tamper-proof in the sense that it cannot be taken apart.

The cartridge may be secured to pedestal 10 by means of screws 84, either before or after placement of the rotary spout 110 around the pedestal. With the cartridge and spout in place the tubular escutcheon 118 may be threaded onto pedestal 10. Thereafter handle 56 may be forced into the protruding stem 54 of the actuator 50. The handle 56 includes a peripheral skirt 57 which conceals the opening 59 in the escutcheon.

INSTALLATION OF THE MIXING FAUCET

The faucet is preferably shipped to the job site with the tubes 20 pre-assembled (soldered) to pedestal 10. The pipe 98 may be shipped attached to or disassembled from the pedestal. In any event the complete faucet is installed by manipulating the faucet assembly downwardly onto rim surface 12 such that the piping moves through the rim opening 13. Thereafter the faucet is held in place by positioning the bracket 15 on the underside of wall 12 and threading nut 17 onto pipe 98. Preferably bracket 15 is a semi-resilient element that exerts a clamping force on wall 12 when nut 17 is sufficiently tightened.

The lower face 16 of the pedestal preferably has pressure contact with the surface of wall 12 to prevent surface water from penetrating the pedestal-rim joint. The actual joint surface area is relatively small because pedestal 10 is circular in plan outline, not elongated as in the case of certain conventional faucets.

The small surface area tends to promote a good seal between the pedestal and the upper face of wall 12. The relatively small plan dimension of the pedestal may also facilitate cleaning of the rim wall 12 surface around the pedestal periphery because there is a lessened peripheral space to be cleaned. FIG. 1 shows the lower peripheral edge of spout 110 very close to the surface of wall 12, but if the illustrated closeness would pose a debris-collection problem the lower peripheral edge of spout barrel could be raised.

OPERATION OF THE SPOUT

It is believed that the FIG. 1 spout-pedestal arrangement has certain advantageous characteristics in connection with day-to-day operation of the spout. Thus, the bearing surfaces 120 and 122 are relatively long, both axially and peripherally, to provide an extensive total bearing area. Such an extensive bearing area distributes the manually applied forces to achieve a low unit area loading and relatively long service life.

VALVE CARTRIDGE REPLACEMENT

To remove and replace the valve cartridge it is necessary to first pull out handle 56 from stem 54, to then unscrew escutcheon 118 from pedestal 10, and to then unthread screws 84 from the pedestal. A new cartridge can then be installed, and the escutcheon and handle replaced.

It is believed that servicing problems should be simplified by using the valve cartridge concept. Thus, to repair a leading valve the service man is required to install only one element. If the cartridge concept were not used the service man might inadvertently or mistakenly replace only one of the two ceramic discs, or he might position one or both ceramic discs incorrectly in the valve body, or he might incorrectly replace the actuator when he should have replaced the discs, or he might leave out portions of the actuator, etc. When the cartridge concept is used there is no possibility for these problems to arise because the service man or householder need only replace one item, namely the entire cartridge.

LOADING DURING SERVICE

During service actuator 50 receives reaction forces in a plane normal to pin 52. The pin is placed in shear loading by these forces. If the pin is formed of steel there should be no service weakness, since the supporting wall areas 76 and 80 have relatively long bearing surface areas engaged with the pin.

Actuator 50 is also loaded in directions normal to slots 75 and 77. The slot side walls have extensive area engagement with the actuator side surfaces so that the actuator is quite able to withstand the loadings without flow or deformation of the plastic materials.

HANDLE LOCATION

The illustrated faucet is designed so that handle 56 is located directly above the valve cartridge. The lever portion 61 of the handle therefore extends directly forwardly into an area that is easily accessible to the user.

In certain prior art ceramic disc faucets the handle is fulcrumed in a zone behind or in back of the valve components. The handle must therefore extend upwardly and then forwardly to the zone of access. The handle is necessarily relatively long, and hence relatively heavy gauge in order to withstand rough usage.

It will also be noted that with the superjacent handle of present FIG. 1 the handle does not occupy any of the rim 12 spaces behind the faucet. Thus, the faucet can be positioned at the extreme rear of the sink or lavatory very closely adjacent the wall of the bathroom or kitchen. The rim 12 can be rather narrow in a front-to-rear direction without obstructing handle movement or valve servicing. With the handle disposed above the valve cartridge the service man can remove the handle by an easy upward motion, which is not possible with other known arrangements.

If the handle were located or mounted behind the faucet the service man would have to reach around in back of the faucet, and in some cases to exert a front-to-rear pulling action to remove the handle. Additional clearance space between the faucet and the room wall would be required to permit such an operation.

The general arrangement of FIG. 1 is believed to be conclusive to easy valve servicing. Additionally the arrangement tends to permit relatively narrow sink rims at the back of the skin. It thereby permits some reduction in the front-to-rear dimension of the sink without sacrificing sink volumetric capacity. In some narrow bathrooms or kitchens the smaller dimensions of the sink and countertop would be helpful in providing sufficient aisle space for the user.

The drawings illustrate one practical embodiment of the invention, but it will be appreciated that some minor variations can be employed without departing from the scope of the invention as it appears in the appended claims.

I claim:

1. A mixing valve cartridge comprising a hollow cartridge body having a first flow-apertured valve disc stationed therewithin; a second flow-apertured valve disc slidable on the first disc for controlling fluid flow through the disc apertures; a race element rotatably mounted within the cartridge body for movement around an axis normal to the disc slide plane; and an actuator pivotally mounted on the race element for movement around an axis transverse to the race element axis; said actuator having a pusher element engaged with the second disc, whereby external forces applied to the actuator cause the second disc to be moved rectilinearly at right angles to the actuator pivot axis and rotatably around the race element axis; said cartridge body being constructed to preclude removal of the discs, race element, and actuator.

2. The cartridge of claim 1 wherein the race element is a two piece assembly, the respective pieces having opposed flat thrust faces engaged against opposite faces of cartridge wall to prevent wobble of the race element.

3. The cartridge of claim 2 wherein the race element pieces are located and retained together by means of a pin that forms the actuator pivot.

4. The cartridge of claim 1 wherein movement of the actuator around the transverse axis is limited by means of two wing-like actuator arms movable toward and away from the race element.

5. The cartridge of claim 4 wherein movement of the race element around its axis is limited by two upstanding cartridge lugs.

6. The cartridge of claim 5 wherein the lugs constitute devices for mounting the cartridge on a valve body.

7. The cartridge of claim 1 wherein the race element comprises two upstanding walls that cooperatively form a slot; said actuator being positioned in said slot so that its side surfaces lie closely against the slot surfaces, whereby to limit stress on the transverse pivot.

8. A hot-cold water mixing faucet comprising an upstanding support pillar having inlet and outlet passages going upwardly to and downwardly from flow port openings in its upper face; a mixing valve cartridge positioned on the pillar upper face; said cartridge comprising a hollow cartridge body having a first apertured valve disc stationed therewithin for directing fluid to and from the aforementioned port openings; a second apertured valve disc slidable on the upper face of the first disc for controlling fluid flow through the disc apertures; a race element rotatably mounted within the cartridge body for movement around a vertical axis normal to the disc slide plane; and an actuator pivotally mounted on the race element for movement around a horizontal axis transverse to the race element axis; said actuator having a depending pusher element engaged with the second disc, whereby a superjacent force applied to the actuator causes the second disc to be moved rectilinearly at right angles to the actuator pivot axis and rotatably around the race element axis, whereby said second disc controls the flow of water into the aforementioned outlet passage; said faucet including a rotary spout having a barrel portion rotatably encircling the pedestal to receive water from the outlet passage.

9. The faucet of claim 8 wherein the barrel of the spout is approximately the same height as the support pedestal, said barrel having two widely spaced areas of bearing engagement with the pedestal adjacent the barrel upper and lower edges.

10. The faucet of claim 8, and further comprising a tubular escutcheon screwed onto the support pillar to conceal the cartridge.

11. The faucet of claim 10 wherein the actuator includes a stem projecting upwardly through a central opening in the tubular escutcheon; and an actuating handle having a releasable slide-down attachment to the stem.

12. The faucet of claim 11 wherein the handle is provided with a depending skirt which conceals the central opening in the escutcheon.

13. A mixing valve cartridge comprising a hollow cartridge body having a first flow-apertured valve disc stationed therewithin; a second flow-apertured valve disc slidable on an exposed face of the first disc for controlling fluid flow through the disc apertures; an actuator pivotally mounted within the cartridge body for movements in two intersecting directions; said actuator having a pusher element operatively engaged with the second disc for moving same in different intersecting paths along the first disc, whereby to vary the volume and temperature of the stream exiting from the discs; said cartridge body being constructed to preclude removal of the discs and actuator, whereby valve disc replacement can only be accomplishded by substitution of a new cartridge.

14. The cartridge of claim 13 wherein the cartridge body comprises a first cup-like casing element having a bottom wall formed with flow-openings therein, and a second cap element having a skirt nesting within the upstanding side wall of the cup-like casing element; the aforementioned discs being disposed within the cup-like casing element, and the actuator being rotatably mounted on the cap element with the pusher element thereof extending into a slot in the movable disc.

15. A hot-cold water mixing faucet comprising an upright support pedestal containing inlet and outlet passages going upwardly to and downwardly from its upper face; a rotary spout having a barrel portion rotatably encircling the pedestal to receive mixed water from the outlet passage; a hollow cartridge body removably secured to the pedestal upper face; said cartridge body having a bottom wall formed with openings that register with the pedestal passages, and a top wall that defines a bearing; a first valve disc immovably seated on the cartridge bottom wall, said first disc having flow apertures therethrough registering with the aforementioned openings in the cartridge bottom wall; a second valve disc slidably seated on the upper face of the first disc within the cartridge body, said second disc having a recess in its lower face arranged to overlap varying areas of the subjacent flow apertures to communicate one aperture with another, thereby adjusting the temperature and volume of the outlet stream; and valve disc actuator means carried by the cartridge body top wall for rotary movement around the axis of the aforementioned bearing, and tilting movement around an axis transverse to the axis of the aforementioned bearing; said actuator means comprising a pusher element extending into a slot in the upper face of the second disc for sliding same along the first disc; the assembly comprising the cartridge body, valve discs and actuator means being constructed as a separate unitary structure that can be removed from the pedestal and/or installed thereon without disturbing the operating connections between the cartridge body, valve discs and actuator means; and a tubular escutcheon carried by the pedestal in surrounding relation to the cartridge, said escutcheon being removable from the pedestal to gain access to the cartridge assembly.

16. The mixing faucet of claim 15 wherein the hollow cartridge is removably secured to the pedestal by means of screws extending downwardly through cartridge bosses into tapped holes in the pedestal.

* * * * *